(12) United States Patent
Govindarajalu et al.

(10) Patent No.: US 9,552,250 B2
(45) Date of Patent: Jan. 24, 2017

(54) DETECTING X86 CPU REGISTER CORRUPTION FROM KERNEL CRASH DUMPS

(71) Applicant: VMware, Inc., Palo Alto, CA (US)

(72) Inventors: Hariprakash Govindarajalu, Mountain View, CA (US); Yujie Chen, Atlanta, GA (US); Sowgandh Sunil Gadi, San Jose, CA (US); Ravi Parimi, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 123 days.

(21) Appl. No.: 14/669,049

(22) Filed: Mar. 26, 2015

(65) Prior Publication Data

US 2016/0283301 A1    Sep. 29, 2016

(51) Int. Cl.
*G06F 11/00*    (2006.01)
*G06F 11/07*    (2006.01)

(52) U.S. Cl.
CPC ......... *G06F 11/079* (2013.01); *G06F 11/0721* (2013.01); *G06F 11/0751* (2013.01); *G06F 11/0778* (2013.01)

(58) Field of Classification Search
CPC . G06F 11/0778; G06F 11/079; G06F 11/0712; G06F 11/0721; G06F 11/0751; G06F 11/36–11/3668
See application file for complete search history.

(56) References Cited

U.S. PATENT DOCUMENTS

| | | | | |
|---|---|---|---|---|
| 2008/0263342 A1* | 10/2008 | Knowles | ............. | G06F 11/0778 712/244 |
| 2008/0301502 A1* | 12/2008 | Harsha | .................. | G06F 11/079 714/37 |
| 2013/0179720 A1* | 7/2013 | Bellows | ................ | G06F 11/366 713/401 |

* cited by examiner

*Primary Examiner* — Michael Maskulinski
(74) *Attorney, Agent, or Firm* — Patterson & Sheridan LLP (57) ABSTRACT

Discovering a hardware failure in a processor is disclosed. When an operating system or application fails, a function containing the instruction that failed along with the register set of the CPU at the failure is recorded. The function is analyzed into its basic blocks. The failing instruction, the failing basic block, the definitions that reach the failing instruction, and the CPU register set at the failure provide information to determine whether the failure was caused by hardware or software. If, after a complete search of the definitions reaching the failing instruction, the search discovers a first definition defining the failing instruction and a second definition defining the first definition such that the second definition reaches the failing instruction and the first definition assigns a register value that does not match a register value in the failing instruction, then a hardware failure is the cause of the crash.

21 Claims, 10 Drawing Sheets

| Index | InstructionNo | basicBlockNo | Instruction (string) | | |
|---|---|---|---|---|---|
| | | | mnemonic | source | dest |
| ... | | | | | |
| 9 | 10 | 0 | mov | 0x218(%rdi) | %r12 |
| ... | | | | | |
| 46 | 76 | 22 | mov | 0x40(%r12) | %rsi |
| 47 | 79 | 23 | mov | 0x8(%rsi) | %ecx |
| 48 | 80 | 23 | mov | $0x1 | %edx |
| 49 | 81 | 23 | mov | 0x18(%rsi) | %rax |
| 50 | 82 | 23 | shl | %cl | %edx |
| 51 | 83 | 23 | lock or | %edx | 0x28(%rax) |
| 52 | 86 | 24 | lfence | | |
| 53 | 87 | 25 | mov | (%rsi) | %rdi |
| 54 | 88 | 25 | xor | %r13d | %r13d | definitions reaching definitions of an instruction

600 definitions

| Index | InstructionNo | basicBlockNo | Instruction (string) | | |
|---|---|---|---|---|---|
| | | | mnemonic | source | dest |
| ... | | | | | |
| ... | | | | | |
| 46 | 76 | 22 | mov | 0x40(%r12) | %rsi |
| 47 | 79 | 23 | mov | 0x8(%rsi) | %ecx |
| 48 | 80 | 23 | mov | $0x1 | %edx |
| 49 | 81 | 23 | mov | 0x18(%rsi) | %rax |
| 50 | 82 | 23 | shl | %cl | %edx |
| 51 | 83 | 23 | lock or | %edx | 0x28(%rax) |
| 52 | 86 | 24 | lfence | | |
| 53 | 87 | 25 | mov | (%rsi) | %rdi |
| 54 | 88 | 25 | xor | %r13d | %r13d | crashInSet = definitions reaching crashInstr

| Index | InstructionNo | basicBlockNo | Instruction ||| |
|---|---|---|---|---|---|
| | | | mnemonic | source | dest |
| ... | | | | | |
| 9 | 10 | 0 | mov | 0x218(%rdi) | %r12 |
| ... | | | | | |
| ... | | | | | |
| ... | | | | | |
| ... | | | | | |
| ... | | | | | |
| ... | | | | | | definitions ← 700

702 → sourceInSet

FIG. 8

DETECTING X86 CPU REGISTER CORRUPTION FROM KERNEL CRASH DUMPS

BACKGROUND

When a complex piece of software, such as an operating system or virtualization layer supporting a virtual machine, encounters a fault, a file containing the state of the processor and memory at the point of the failure is saved. However, it is not known at the time of the failure whether the failure is caused by hardware or software. To find out the cause of failure requires close examination of the instructions of the processor and the processor states in the saved file. It is especially important to determine whether the failure is due to hardware or software so that the proper resources can be brought to bear to correct the failure. For example, if the crash is not caused by hardware, then the failure must be due to software, and software expertise can be deployed to search for the program error. If the crash is caused by a hardware failure, then such software expertise need not be employed and the manufacturer of the processor must determine how to correct such faults.

SUMMARY

One embodiment is a method for discovering a hardware failure in a processor. The method includes, upon detecting a crash event, obtaining a failing instruction and a failing register used by the failing instruction, where the failing register contains a particular value, performing a search through entries of a first set of definitions that reach the failing instruction, and if the search is completed and the search finds a first definition that defines the failing instruction and a second definition that defines the first definition, where the second definition reaches failing instruction, and the first definition assigns a register value that does not match the particular value contained in the failing register, reporting that the cause of the crash event is a hardware failure.

Further embodiments of the present invention include a non-transitory computer-readable storage medium comprising instructions that cause a computer system to carry out one or more aspects of the above method, and a computer system configured to carry out one or more aspects of the above method.

DETAILED DESCRIPTION

Overview

When an operating system or application fails, information relating to the failure is recorded. Included in the information is a function containing the instruction that failed along with the register set of the CPU at the failure. The function containing the failed instruction is disassembled and analyzed into its basic blocks, one of which contains the instruction that failed. Blocks containing definitions (i.e., assignments of variables used in the failing block) for the block containing the failed instruction are discovered and analyzed to determine the instruction definitions that are valid for the failing instruction in the failing block. The failing instruction, the failing block, the blocks that reach the failing block, the definitions that reach the failing instruction, and the CPU register set at the failure provide sufficient information for an algorithm to determine whether the failure was caused by hardware or software.

Figure 1:
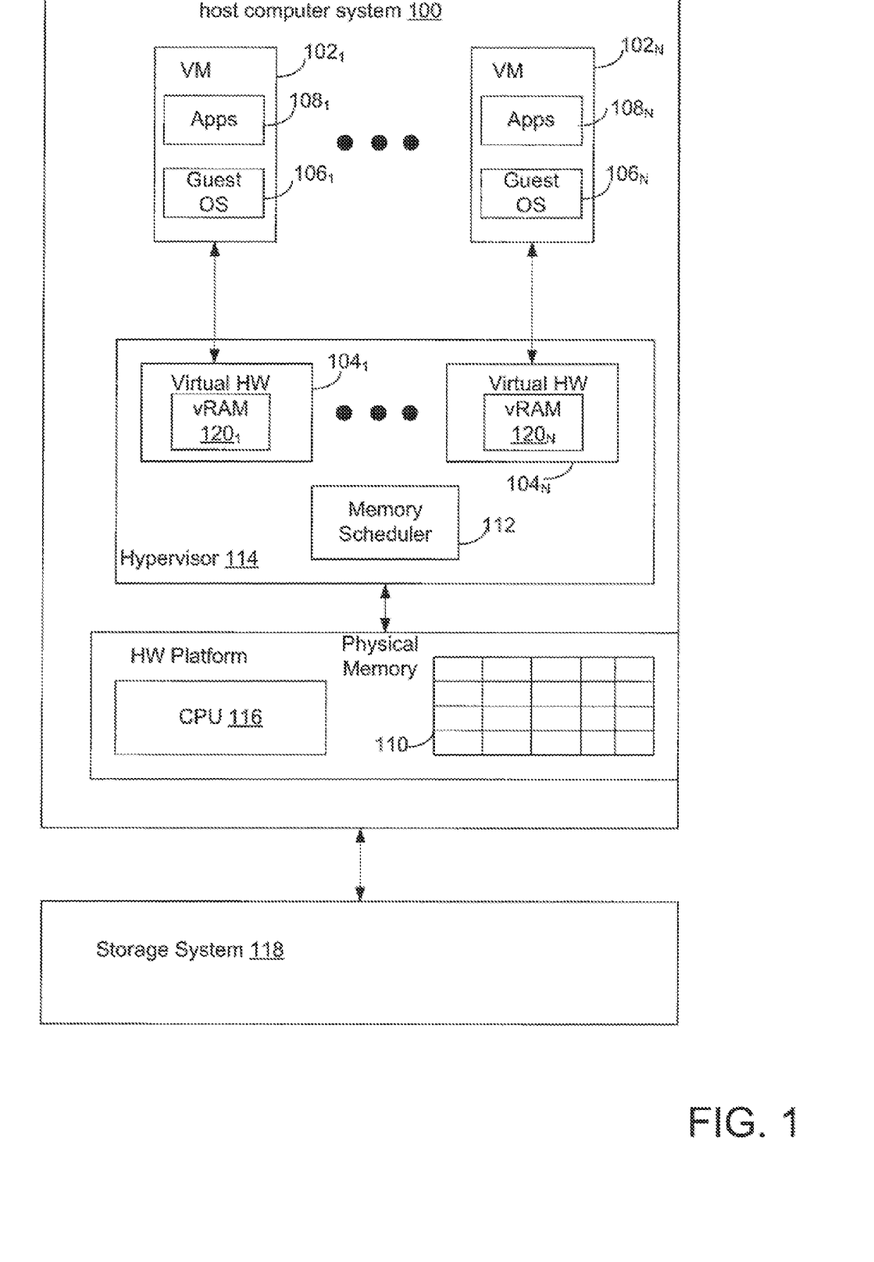
FIG. 1 depicts a host computer system with one or more virtual machines.

FIG. 1 depicts a host computer system 100 that includes CPU 116 and physical memory 110, and that is coupled to storage system 118. Host computer system 100 is also configured with a hypervisor 114, which supports the execution of one or more virtual machines $102_1$-$102_N$ (collectively referred to as virtual machines 102) by emulating virtual hardware $104_1$-$104_N$, each of which includes virtual RAM (vRAM) $120_1$-$120_N$. Each of the virtual machines has a designated amount of virtual RAM allocated thereto so that it can carry out tasks of a guest operating systems 106 and guest applications 108 executing therein. The virtual RAM allocated to each virtual machine is backed by the physical memory (pRAM) 110 in host computer system 100. In the above virtual machine, the guest application or the guest operating system can fail to operate correctly, causing a crash.

Applications, such as guest applications, and operating systems, such as guest operating systems, are, in a general sense, a large and complex set of interacting functions. When a failure occurs in an application or operating system, it is convenient to view the function in which the failure occurred as the starting point for analysis of the failure. Within the function, a number of basic blocks can be identified, where a basic block is a sequence of consecutive instructions such that entrance into the block occurs at the block's first instruction and exit from the block occurs at the block's last instruction. Execution of the function can take a number of execution paths through the instructions that implement the function. With the basic blocks identified, a graph of the execution path through the basic blocks can be identified. Such a graph is called a control flow graph (CFG), its nodes being the basic blocks and its edges being the possible flows through the blocks to represent the paths through the instructions of the function.

Figure 2A:
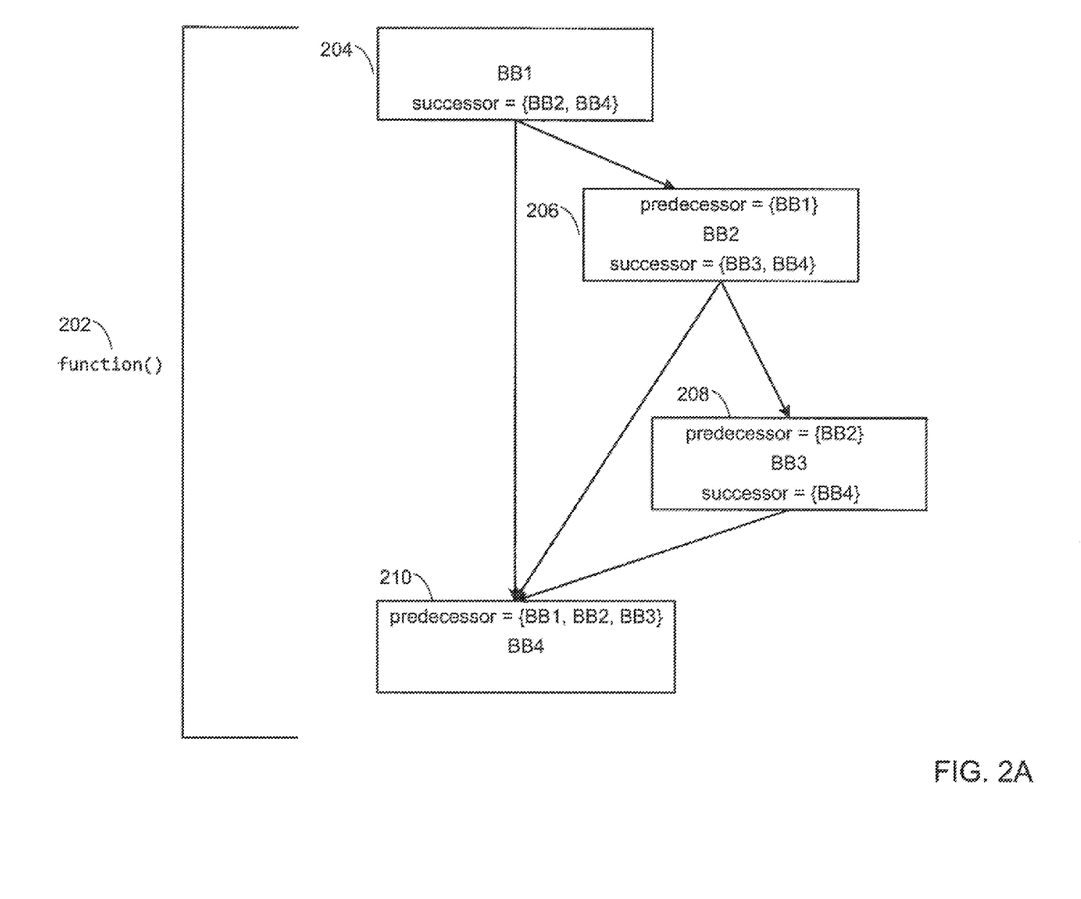
FIG. 2A depicts an example flow graph for the basic blocks of a function.

FIG. 2A depicts an example flow graph for the basic blocks for a function 202. The function 202 includes basic blocks BB1 204, BB2 206, BB3 208, and BB4 210. For the function 202, control flows from BB1 204 to BB2 206 or BB4 210, from BB2 206 to BB3 208 or BB4 210, and from BB3 208 to BB4 210.

Figure 2B:
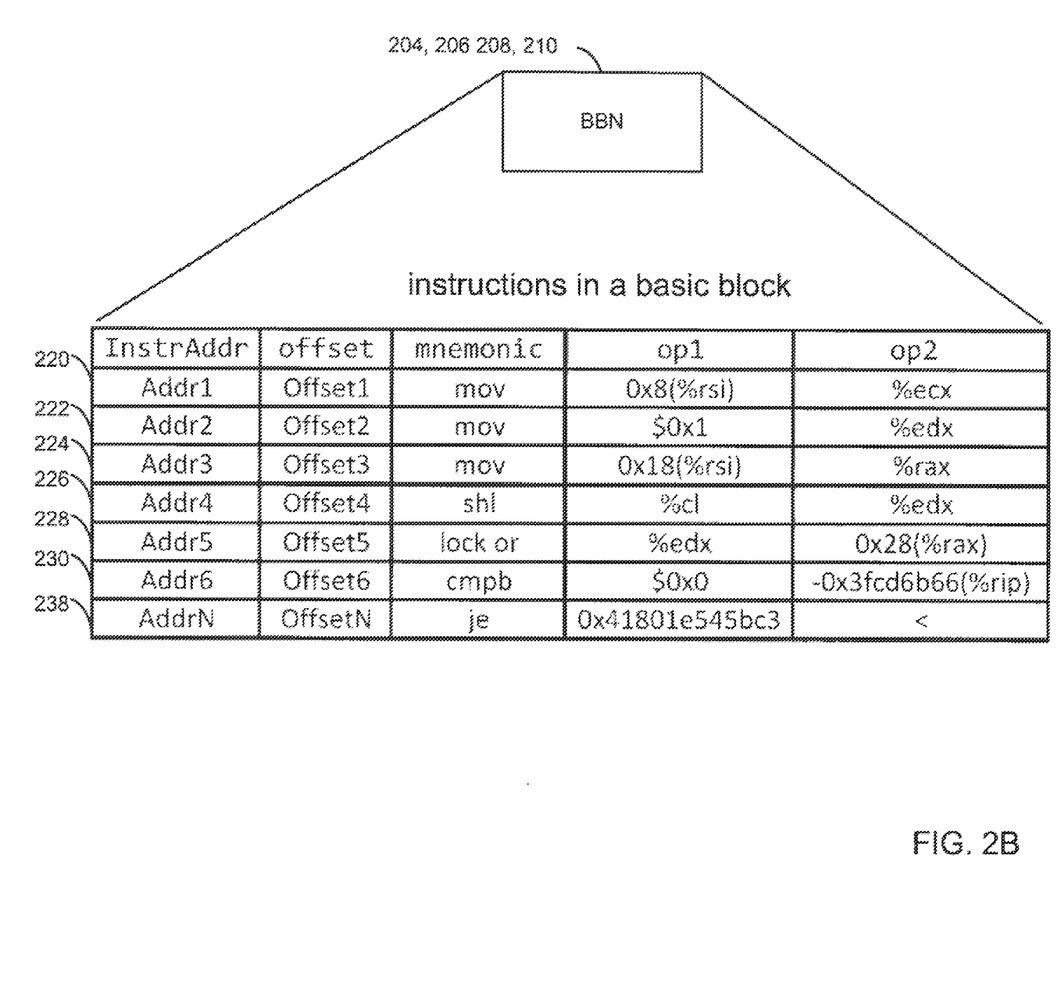
FIG. 2B depicts a format of a basic block.

FIG. 2B depicts example instructions of a basic block (such as BB1 204, BB2 206, BB3 208, and BB4 210 in FIG. 2A) for an x86 type CPU using AT&T notation, which is a popular notation for assembly language of such CPUs. Each row 220-238 in the basic block is a tuple that describes the instruction, where the tuple is defined as (InstrAddr, offset, mnemonic, op1, op2). The InstrAddr provides the memory address of the instruction, the Offset gives the offset from the memory address, the mnemonic gives a string for the name of the instruction, and op1 and op2 are each a string for the first and second operands of the instruction. Entry into the basic block occurs at Addr1 and the exit from the block occurs at AddrN. Within the basic block, certain instructions use the contents of registers to make accesses to storage locations. For example, in FIG. 2B, the instruction at Addr5 logically "ORs" (with a lock) the contents of the edx register with the contents of a memory location whose address is the contents of the rax register+↓x28, where 0xYY is notation for a hexadecimal number YY.

When an instruction uses a register to access data, it is important to determine the instruction that defined the contents of the register before it was used. This is called the definition of the instruction. For example, the instruction at Addr5 has a definition at Addr3, where an instruction loads the contents of the rax register.

Each instruction in a basic block has a definition, which is an assignment of values to any registers that the instruction uses. The definition may occur in the same basic block or it may occur in a different basic block. To track to the flow of data into and out of the block, two items are needed: an IN(B) set for a basic block B and an OUT(B) set for the basic block B. The IN(B) set contains all of the definitions from other blocks for instructions in block B. The OUT(B) set contains all of the definitions that are valid upon exiting block B. If OUT(B) equals IN(B), then nothing in block B altered the incoming definitions. Often, however, block B alters the relationship between IN(B) and OUT(B) by either "killing" definitions (i.e., redefining an existing assignment) or generating new definitions. Two additional sets, gen(B) and kill(B) are needed to describe these operations. The gen(B) set contains definitions that originate in block B and kill(B) contains definitions from the IN(B) set that are not valid (i.e., killed) due to activity, such as a new assignment, in block B.

A relationship exists among these four sets. The OUT(B) set, according to Eq. 1 below, is the set of all definitions generated by block B added to the set of all definitions that are still valid upon entering block B and not killed by block B.

$$\text{OUT}(B)=\text{gen}(B)\cup(\text{IN}(B)-\text{kill}(B)) \quad \text{(Eq. 1)}$$

Computing the IN(B) for a particular block is as set forth below. The IN(B) set, according to Eq. 2, is the generalized union of the OUT(B) sets over all of the blocks that feed into block B (i.e., the predecessor blocks, denoted by pred(B), in the control flow graph).

$$\text{IN}(B)=\cup_P(\text{OUT}(P)|P\in\text{pred}(B)) \quad \text{(Eq. 2)}$$

Figure 3:
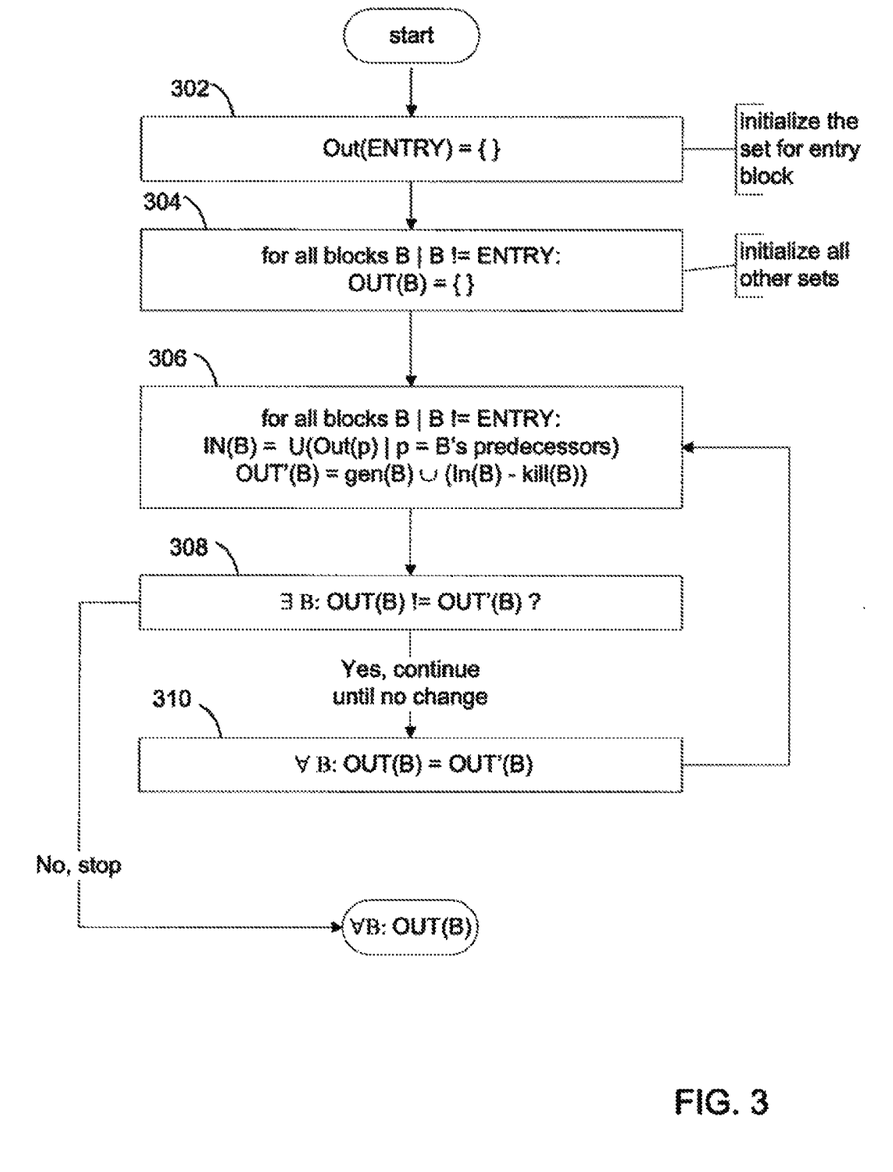
FIG. 3 depicts an example flow chart for determining an OUT(B) set of the basic block B.

Computing an OUT(B) set for a complex control flow graph is more involved as the computation of the OUT(B) set for each block affects the computation of other OUT(B) sets in the CFG, and thus requires an iteration until the computation converges. FIG. 3 depicts an example flow chart for finding the OUT(B) set for each block in a control flow graph (CFG) of a function. In step 302, the set for the entry block of the graph is initialized. In step 304, the sets for all other blocks in the graph are initialized. Then, in step 306, the IN(B) and OUT(B) for each block, except the entry block, in the graph are computed. In step 308, the previous each OUT(B) set is compared to the new OUT(B) set. As determined in step 308, if at least one OUT(B) set is different from the new OUT(B) set, then all of the sets are updated in step 310 and the sets are recomputed. When there is no OUT(B) change, the iteration completes, and all of the OUT(B) sets are returned.

The sets OUT(B) and IN(B) are related to definitions for a particular instruction d in a block. Specifically, the sets OUT(B) and IN(B) are related to an incoming set of definitions, IN(d), and outgoing set of definitions OUT(d) for a particular instruction within a basic block, where the set IN(d) is the set of all definitions reaching a particular instruction d and the set OUT(d) is the set of all definitions that are still valid after instruction d. As in the case with the blocks, two other sets, gen(d) and kill(d) are needed. The gen(d) set is the instruction d itself and the kill(d) set is all definitions that redefine the same register or memory location as instruction d.

Similar to the case with blocks, there is a relationship between the OUT(d), IN(d), gen(d) and kill(d) sets. The OUT(d) set, according to Eq. 3, equals the gen(d) set plus those definitions in the IN(d) set that are not killed (also called reaching definitions).

$$\text{OUT}(d)=\text{gen}(d)\cup(\text{IN}(d)-\text{kill}(d)) \quad \text{(Eq. 3)}$$

Additionally, there is a relationship between the gen(d) and kill(d) sets and the gen(B) and kill(B) sets. The kill set for block B, according to Eq. 4, is the union of all of the kill($d_i$) sets for each instruction $d_i$. The gen set for block B, according to Eq. 5, is the union of all of the functions f($d_i$) which compute the gen set for the instruction $d_i$ less the kill sets for all of the successors of $d_i$.

$$\text{kill}(B)=\cup_1^n\text{kill}(d_i) \quad \text{(Eq. 4)}$$

$$\text{gen}(B)=\cup_n^1 f(d_i) \quad \text{(Eq. 5)}$$

where $f(d_i)=\text{gen}(d_i)-\cup_n^1\text{kill}(\text{succ}(d_i))$

For example, for the second to last instruction in the block, the function f is: $f(d_{n-2})=\text{gen}(d_{n-2})-(\text{kill}(d_n)\cup\text{kill}(d_{n-1}))$, because the only successor instructions to $d_{n-2}$ are $d_{n-1}$ and $d_n$.

Figure 4:
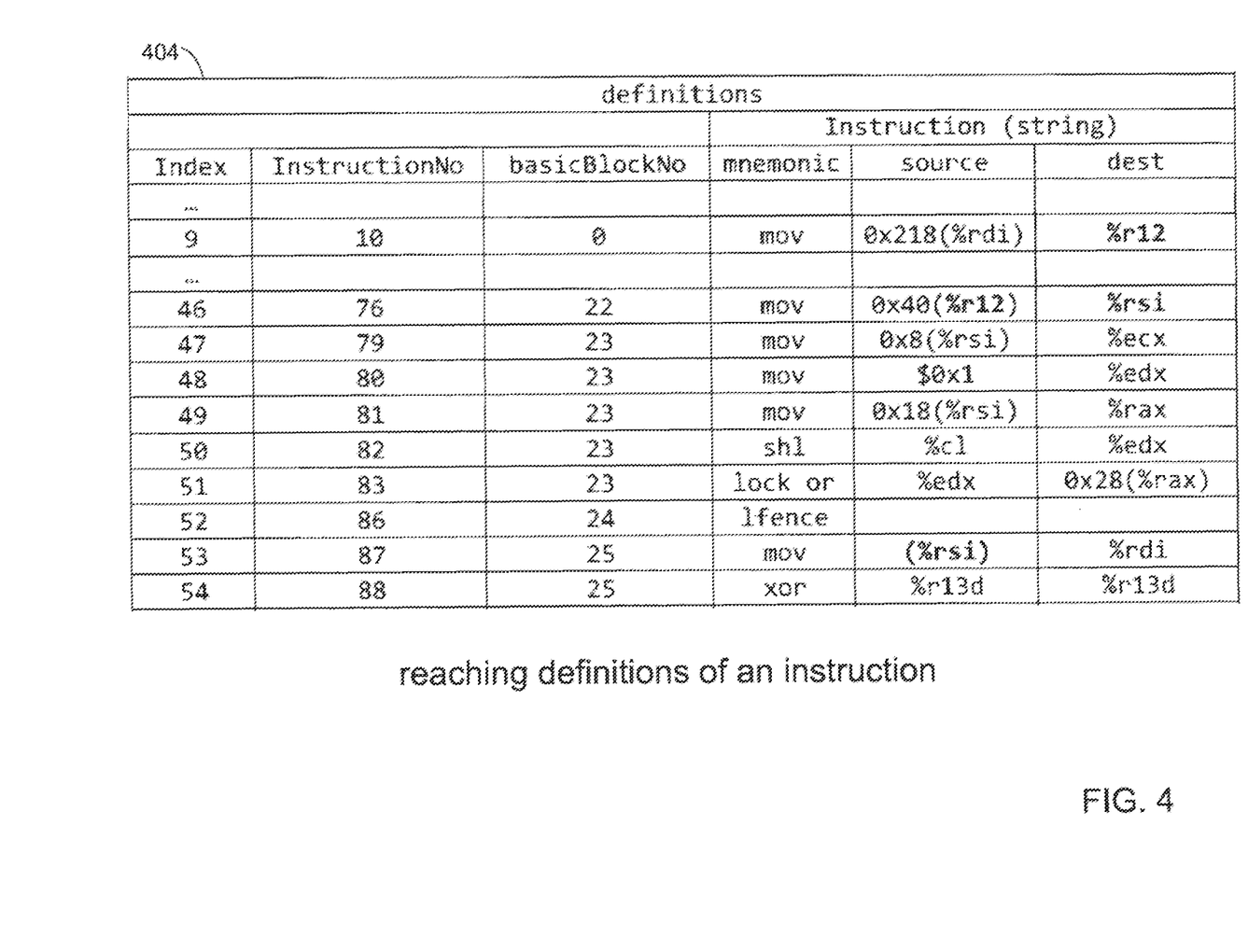
FIG. 4 depicts the format of definitions of an instruction in a basic block.

FIG. 4 depicts the format of a sample list 404 of definitions (i.e., the IN(d)−kill(d) set) for an instruction (denoted instruction 87) in a basic block (denoted basic block 25).

Each definition has the form of a tuple comprising: (Index,InstructionNo,basicBlockNo,mnemonic,source, dest), where the Index is a pointer to items in the list, InstructionNo is the number of the instruction in the basic block in which it occurs, basicBlockNo is the block number of the instruction, mnemonic is the name of the instruction as a sequence of characters, source is the source operand and dest is the destination operand, also a sequence of characters. Thus, instruction 87 in block 25 is a move from the contents of memory location, whose address is in the rsi register, to the rdi register.

Having the function decomposed into its basic blocks and having computed the IN(B) and OUT(B) for each of the basic blocks makes it possible to identify register corruption if a crash event occurs.

Figure 5:
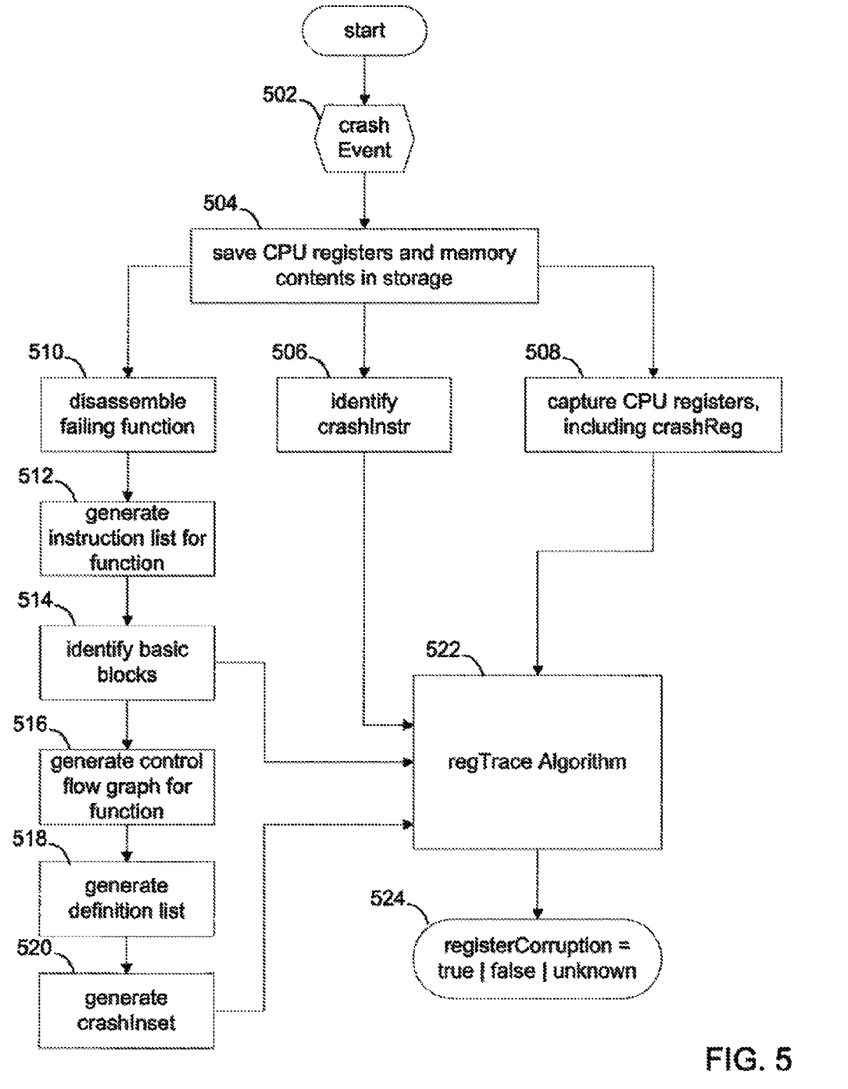
FIG. 5 depicts the process performed in response to a crash event.
Figure 6:
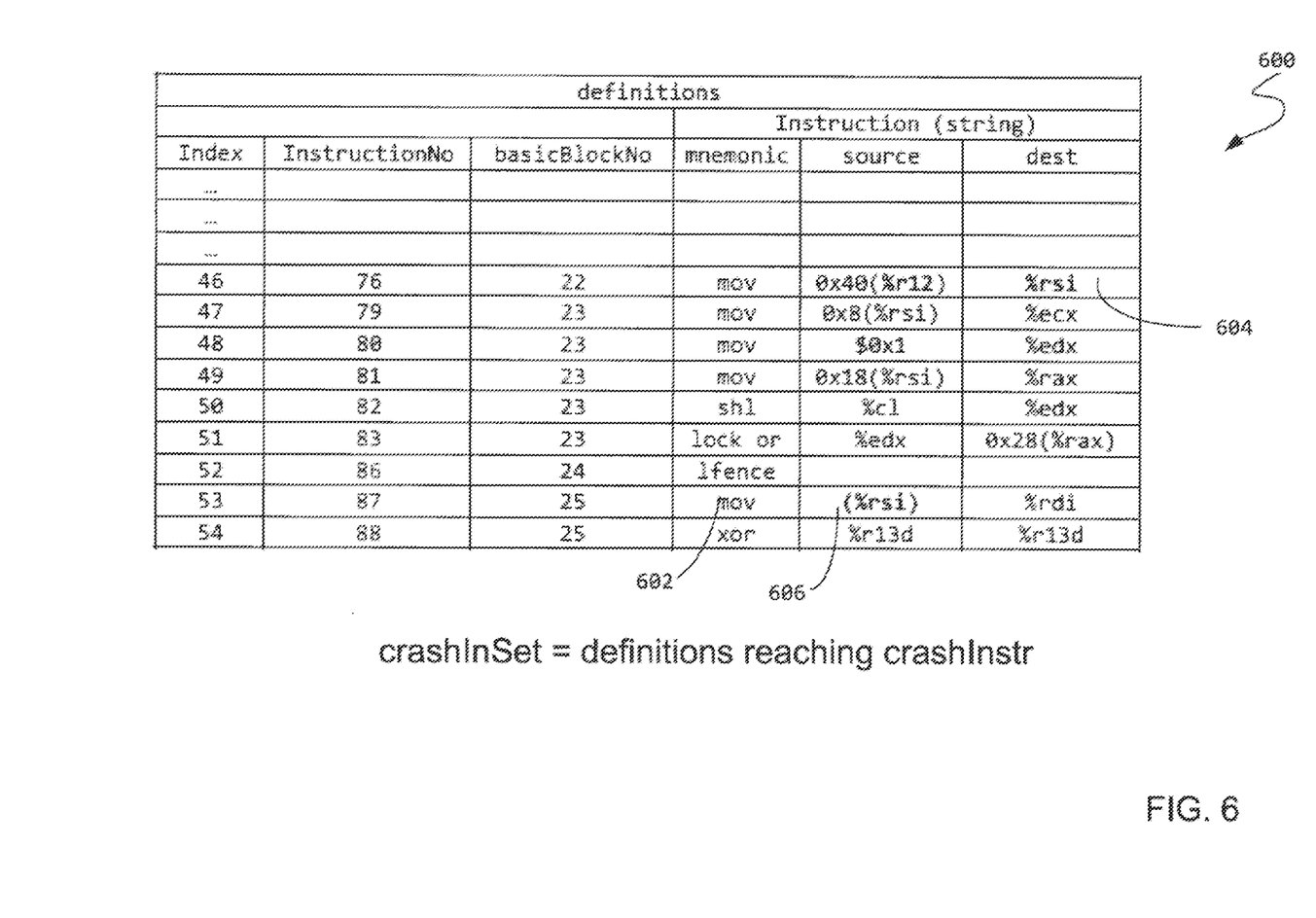
FIG. 6 depicts a crashInSet.

FIG. 5 depicts the process performed upon receiving a failure, i.e., a crash event, and how this information is obtained. If, while an application is running, the application or kernel crashes, as determined in step 502, then, in step 504, the CPU registers and memory contents of the application and kernel are saved in storage as a core dump. In step 506, the instruction that failed is identified (the crashInstr) and, in step 508, the CPU registers including the register in the instruction that failed (crashReg) is identified. In step 510, the code for the failing function is disassembled and the instruction list for the function is generated in step 512. In step 514, the basic blocks of the function are identified and in step 516, the control flow graph for the basic blocks of the failing function, such as the blocks depicted in FIG. 2A, is generated. In step 518, the reaching definition list for the failing instruction is generated and the crashInSet, depicted in FIG. 6, is computed in step 520, where the crashInSet is the IN(d) set for the failing instruction. Therefore, at the end of this process, the crash register (crashReg), the crash instruction (crashInstr), the IN set for the crash instruction (crashInSet), and the basic blocks are available to an algorithm 522 for computing, in step 524, whether or not the failure was caused by register corruption.

FIG. 6 depicts a crashInSet 600. In one embodiment, this set is a modified version of the definitions for the failing instruction. In particular, the set of definitions has had certain instructions removed or ignored. Instructions that are ignored include instructions such as call, jump and compare. Instructions that are removed include instructions that modify a particular register implicitly. In another embodiment, the set of definitions of the failing instruction are not modified by removing or ignoring certain instructions. In the example given in FIG. 6, the failing instruction 602 is at block 25, instruction 87. The definition 604 of that instruction is at block 22, instruction 76, because this instruction 604 assigns the value of the rsi register, which is used in the failing instruction in a memory access.

Figure 7:
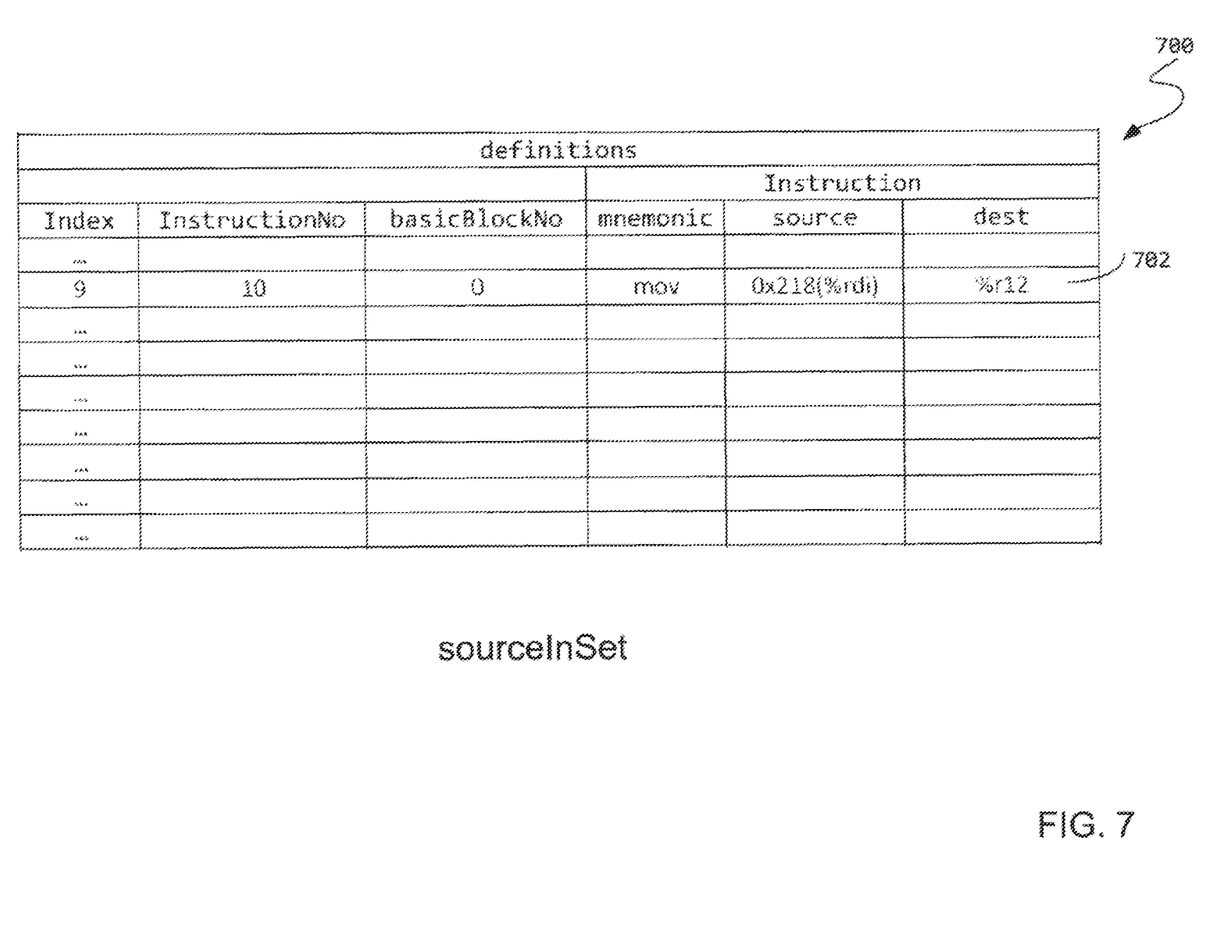
FIG. 7 depicts a sourceInSet.

Another set, depicted in FIG. 7, called the sourceInSet 700, is used in the algorithm. This set is similar to the crashInSet, but is an IN(d) type set for the definitions for the failing instruction, and is available when the definition of the failing instruction is determined. In effect, there is a definition usage chain such that Def2→Use2→Def1→Use1, where Use1 is the failing instruction 602 in FIG. 6, Def1 is the definition contained in the crashInSet 600, Use2 is the source of the failing instruction and Def2 is the definition of Use2. If such a definition usage chain is present, then Def2 reaches the failing instruction. In FIG. 7, instruction 702 is the instruction that defines the definition 604 of the failing instruction 602 in FIG. 6. In particular, the sourceInSet includes a definition of the register r12 which was used in the definition of the instruction that caused the failure.

Figure 8:
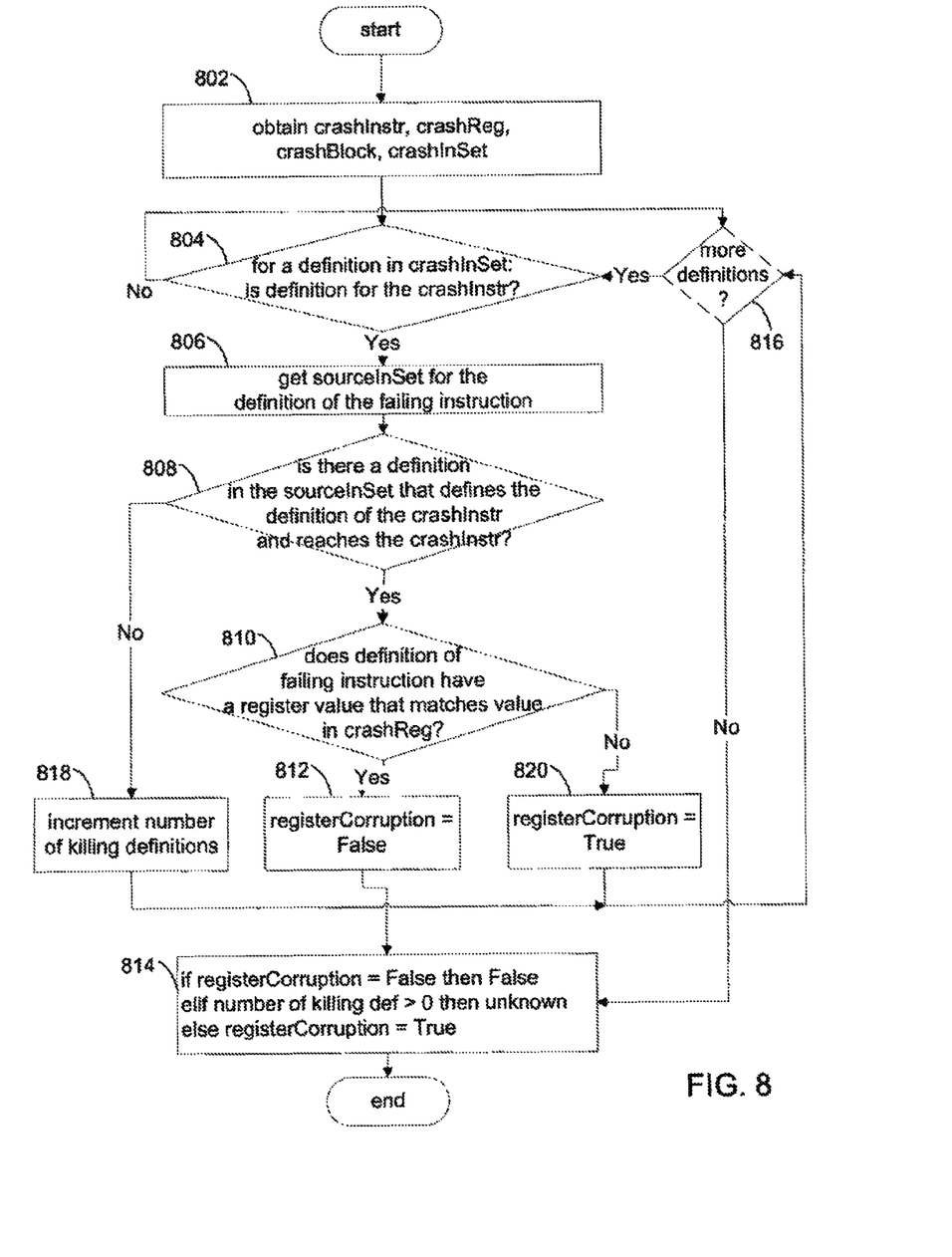
FIG. 8 depicts an example flow chart of an algorithm for determining whether a hardware failure caused a system crash.

FIG. 8 depicts an example flow chart of an algorithm for determining whether a hardware failure caused the crash. In step 802, the crashInstrNum, crashReg, crashBlock, and crashInSet are collected from the core dump. As explained above, the crashInstrNum is the number in the block of the failing instruction, the crashBlock is the block containing the failing instruction, and the crashReg is the register used in the failing instruction to perform a data access causing the failure. In step 804, a search is started through the definitions in the crashInSet to find a definition (the first definition) of the failing instruction. If a definition is found, then in step 806, the sourceInSet for the definition of the failing instruction is obtained. This set contains definitions that define the definition of the failing instruction. If, as determined in step 808, the sourceInSet has a definition (the second definition) that defines and reaches the definition of the failing instruction, then the algorithm has located the source definition of the failing instruction. This permits the comparison in step 810 to be made. In step 810, the value of the definition of the register in the definition of the failing instruction is compared to the value in the crashReg. If there is a match, then, in step 812, a register corruption variable is set to False and the search ends and reports, in step 814, that a hardware fault is not the cause of the crash.

If, in step 804, there is no match and there are more definitions in the crashInSet, as determined in step 816, then the search continues through the definitions in the crashInSet.

If, in step 808, there is no match, then the algorithm increments the number of killing definitions in step 818 and continues searching through the definitions in the crashInSet, because it may find a source definition for the definition of the failing instruction that is valid. If no such definition is present, then when the search ends, the algorithm reports that register corruption cannot be determined in step 814.

If, in step 810, there is no match, then the algorithm sets the register corruption variable to True in step 820, but continues the search through the definitions in the crashInSet, because it may find a different definition having a register value that matches the crash register value, thus allowing it to report that no register corruption has occurred.

If, after searching through all of the definitions in the crashInSet, it is determined that the register corruption variable is True, then register corruption is reported in step 814, as True only if the number of killing definitions is zero in step 818. Thus, the algorithm only reports register corruption as True if the definition of the failing instruction is available and the source definition is available and reaches the failing instruction.

Figure 9:
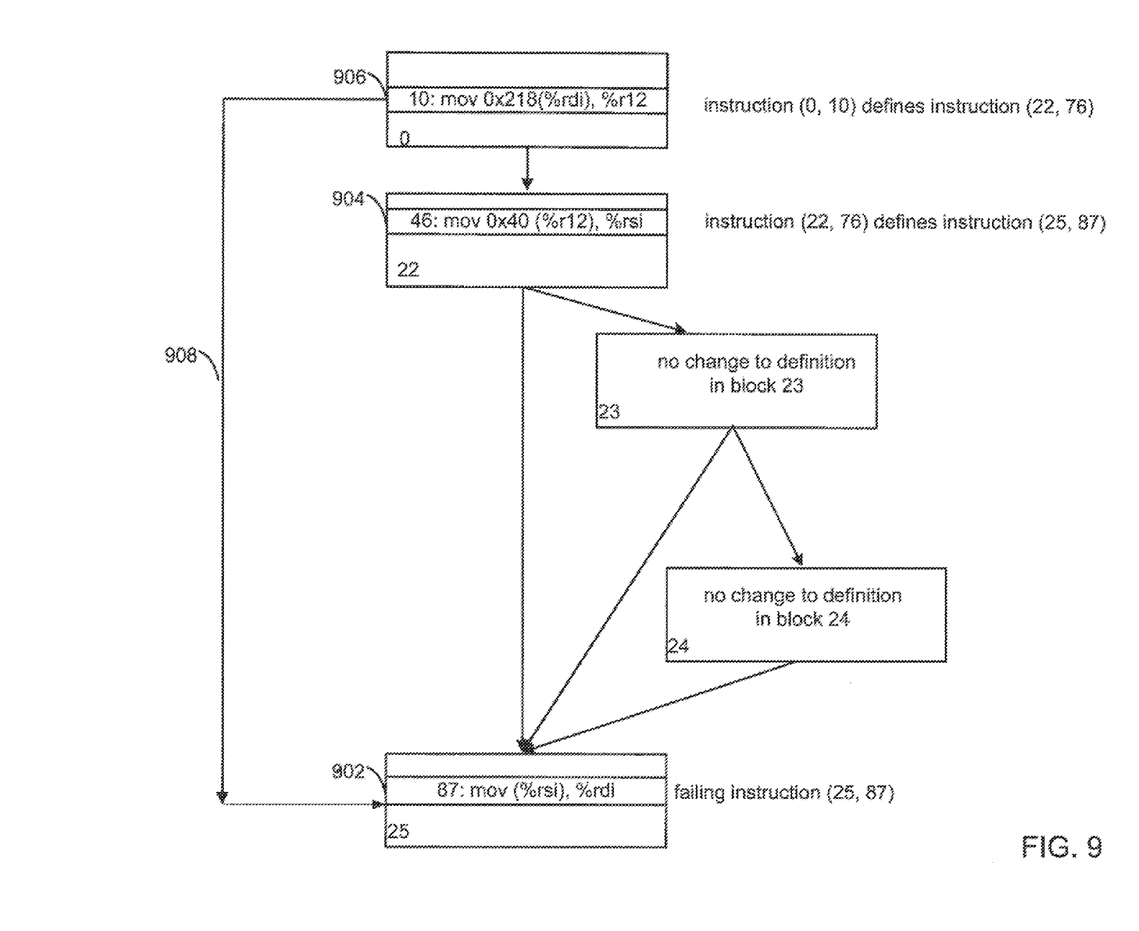
FIG. 9 depicts block locations of a failing instruction and the definitions of the failing instruction.

FIG. 9 depicts example block locations of the failing instruction and its definition. The failing instruction 902, (mov (% rsi), % rdi), is instruction (25, 87), where the first number is the block number and the second is the instruction number in the block. If, during a search of the definition list for the failing instruction (step 804 of FIG. 8), the search discovers that instruction 904 (22, 76) defines instruction 902 (25, 87), ("yes" branch of step 804), and that instruction 906 (0, 10) defines instruction (22, 76), and reaches instruction (25, 87), as indicated by 908 (step 808 of FIG. 8), and the value in register rsi of(22, 76) matches that of the rsi of (25, 87), ("yes" branch step 810 of FIG. 8), the search is ended immediately (in step 812 of FIG. 8), and a hardware failure is not the cause of the crash as depicted in step 814 of FIG. 8.

If the search of the definition list is completed ("yes" branch of step 816) and the search discovers in step 804 that instruction 904 (22, 76) defines instruction 902 (25, 87), but that instruction 906 (0, 10), which defines instruction (25, 87), does not reach instruction (25, 87) ("no" branch of step 808) then the cause of the crash is unknown, as depicted in step 814 of FIG. 8. This means that another instruction killed the definition by instruction (0, 10) (step 818).

If the search of the definition list is completed and the search discovers ("yes" branch of step 804) that instruction 904 (22, 76) defines instruction 902 (25, 87) and that instruction 906 (0, 10), which defines (22, 76) reaches instruction (25, 87) ("yes" branch of step 808), but that the value in register rsi of instruction (22, 76) does not match that of register rsi of(25, 87) ("no" branch of step 810), then the cause of the crash is a hardware failure as depicted in step 820 of FIG. 8.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operation system in which at least one application runs. It should be noted that these embodiments may also apply to other examples of contexts, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for discovering a hardware failure in a processor, the method comprising:
    upon detecting a crash event, obtaining a failing instruction and a failing register used by the failing instruction, the failing register containing a particular value;
    performing a search through entries of a first set of definitions that reach the failing instruction; and
    if the search completes and finds a first definition that defines the failing instruction and a second definition that defines the first definition, the second definition reaching the failing instruction, and the first definition assigning a register value that does not match the particular value contained in the failing register, then reporting that the cause of the crash event is a hardware failure.

2. The method according to claim 1, if the search is completed and the search finds a first definition that defines the failing instruction and a second definition that defines the first definition, the second definition not reaching the failing instruction, reporting that the cause of the crash event is unknown.

3. The method according to claim 1, wherein if, during the search, the search finds a first definition that defines the failing instruction and a second definition that defines the first definition, the second definition reaching the failing instruction and the first definition having a register value that matches the particular value of the failing register, ending the search and reporting that the cause of the crash event is not a hardware failure.

4. The method according to claim 1, wherein the first set of definitions is a crash IN set of the failing instruction.

5. The method according to claim 1, wherein the second definition is found in a source IN set of the first definition.

6. The method according to claim 1,
    wherein the failing instruction occurs in a particular function, the particular function being composed of a set of basic blocks; and
    wherein the first set of definitions is derived from basic blocks of the particular function.

7. The method according to claim 6, wherein the basic blocks of the particular function are derived by disassembling machine code for the particular function.

8. A computer program product stored on a non-transitory computer readable storage medium and configured to cause a computer system to perform a method for discovering a hardware failure in a processor, the method comprising:
    upon detecting a crash event, obtaining a failing instruction and a failing register used by the failing instruction, the failing register containing a particular value;
    performing a search through entries of a first set of definitions that reach the failing instruction; and
    if the search completes and finds a first definition that defines the failing instruction and a second definition that defines the first definition, the second definition reaching the failing instruction, and the first definition assigning a register value that does not match the particular value contained in the failing register, then reporting that the cause of the crash event is a hardware failure.

9. The method according to claim 8, if the search is completed and the search finds a first definition that defines the failing instruction and a second definition that defines the first definition, the second definition not reaching the failing instruction, reporting that the cause of the crash event is unknown.

10. The method according to claim 8, wherein if, during the search, the search finds a first definition that defines the failing instruction and a second definition that defines the first definition, the second definition reaching the failing instruction and the first definition having a register value that matches the particular value of the failing register, ending the search and reporting that the cause of the crash event is not a hardware failure.

11. The method according to claim 8, wherein the first set of definitions is a crash IN set of the failing instruction.

12. The method according to claim 8, wherein the second definition is found in a source IN set of the first definition.

13. The method according to claim 8,
   wherein the failing instruction occurs in a particular function, the particular function being composed of a set of basic blocks; and
   wherein the first set of definitions is derived from basic blocks of the particular function.

14. The method according to claim 13, wherein the basic blocks of the particular function are derived by disassembling machine code for the particular function.

15. A computer system for discovering a hardware failure in a processor, the computer system including a processor programmed to:
   upon detecting a crash event, obtain a failing instruction and a failing register used by the failing instruction, the failing register containing a particular value;
   perform a search through entries of a first set of definitions that reach the failing instruction; and
   if the search completes and finds a first definition that defines the failing instruction and a second definition that defines the first definition, the second definition reaching failing instruction, and the first definition assigning a register value that does not match the particular value contained in the failing register, then report that the cause of the crash event is a hardware failure.

16. The computer system according to claim 15, if the search is completed and the search finds a first definition that defines the failing instruction and a second definition that defines the first definition, the second definition not reaching the failing instruction,
   reporting that the cause of the crash event is unknown.

17. The computer system according to claim 15, wherein if, during the search, the search finds a first definition that defines the failing instruction and a second definition that defines the first definition, the second definition reaching the failing instruction and the first definition having a register value that matches the particular value of the failing register, ending the search and reporting that the cause of the crash event is not a hardware failure.

18. The computer system according to claim 15, wherein the first set of definitions is a crash IN set of the failing instruction.

19. The computer system according to claim 15, wherein the second definition is found in a source IN set of the first definition.

20. The computer system according to claim 15,
   wherein the failing instruction occurs in a particular function, the particular function being composed of a set of basic blocks; and
   wherein the first set of definitions is derived from basic blocks of the particular function.

21. The computer system according to claim 20, wherein the basic blocks of the particular function are derived by disassembling machine code for the particular function.

* * * * *